(12) United States Patent
Schneider (10) Patent No.: US 7,748,738 B2
(45) Date of Patent: Jul. 6, 2010

(54) AIRBAG CUSHION WITH ADAPTIVE DIFFUSER FOR OUT-OF-POSITION CONDITIONS

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 557 days.

(21) Appl. No.: 11/528,042

(22) Filed: Sep. 27, 2006

(65) Prior Publication Data

US 2008/0073893 A1    Mar. 27, 2008

(51) Int. Cl.
B60R 21/239    (2006.01)
(52) U.S. Cl. ............... 280/740; 280/729; 280/743.2
(58) Field of Classification Search ............ 280/729, 280/739, 740, 743.2
See application file for complete search history.

(56) References Cited

U.S. PATENT DOCUMENTS

| | | | |
|---|---|---|---|
| 5,016,913 A | 5/1991 | Nakajima et al. | |
| 5,172,933 A | 12/1992 | Strasser | |
| 5,246,250 A * | 9/1993 | Wolanin et al. | 280/739 |
| 5,280,953 A | 1/1994 | Wolanin et al. | 280/739 |
| 5,306,043 A | 4/1994 | Mihm et al. | |
| 5,350,188 A | 9/1994 | Sato | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,603,526 A | 2/1997 | Buchanan | |
| 5,931,497 A | 8/1999 | Fischer | |
| 6,056,318 A | 5/2000 | Braunschadel | |
| 6,095,557 A | 8/2000 | Takimoto et al. | |
| 6,126,196 A | 10/2000 | Zimmerman | |
| 6,139,048 A | 10/2000 | Braunschädel | 280/728.1 |
| 6,183,003 B1 | 2/2001 | Matsuhashi et al. | |
| 6,206,408 B1 | 3/2001 | Schneider | |
| 6,247,726 B1 | 6/2001 | Ryan | |
| 6,290,257 B1 | 9/2001 | Bunce et al. | 280/739 |
| 6,371,509 B1 | 4/2002 | Ellerbrok et al. | |
| 6,398,258 B2 | 6/2002 | Hamada et al. | |

(Continued)

FOREIGN PATENT DOCUMENTS

DE    196 40 322    3/1996

(Continued)

OTHER PUBLICATIONS

Office Action issued Nov. 12, 2008 in co-pending U.S. Appl. No. 11/528,265.

(Continued)

Primary Examiner—Paul N. Dickson
Assistant Examiner—Timothy Wilhelm
(74) Attorney, Agent, or Firm—Sally J Brown; Stoel Rives LLP (57) ABSTRACT

An airbag cushion is disclosed for use in automotive protective systems. The airbag cushion includes a diffuser tethered to the membrane of the cushion. The airbag cushion partially expands when an obstruction is encountered and fully expands when no obstruction is encountered. The tethered diffuser is controlled by expansion of the cushion. This permits the cushion to vary the amount of gas vented from the cushion to adjust for out-of-position conditions and normal restraint conditions.

29 Claims, 7 Drawing Sheets

U.S. PATENT DOCUMENTS

| | | | |
|---|---|---|---|
| 6,631,922 B2 | 10/2003 | Hess et al. | 280/730.2 |
| 6,648,371 B2 * | 11/2003 | Vendely et al. | 280/739 |
| 6,746,045 B2 | 6/2004 | Short et al. | |
| 6,773,027 B2 | 8/2004 | Bohn et al. | |
| 6,773,030 B2 * | 8/2004 | Fischer | 280/739 |
| 6,832,778 B2 | 12/2004 | Pinsenschaum et al. | |
| 6,863,304 B2 | 3/2005 | Reiter et al. | |
| 6,918,613 B2 | 7/2005 | Short et al. | |
| 6,932,385 B2 | 8/2005 | Hawthorn et al. | |
| 6,971,671 B2 | 12/2005 | Schneider et al. | |
| 7,059,634 B2 | 6/2006 | Bossecker et al. | 280/739 |
| 7,083,191 B2 | 8/2006 | Fischer | |
| 7,083,192 B2 | 8/2006 | Fischer et al. | |
| 7,210,702 B2 | 5/2007 | Soderquist | |
| 7,237,802 B2 | 7/2007 | Rose et al. | |
| 7,261,319 B2 | 8/2007 | DePottey et al. | |
| 7,328,915 B2 | 2/2008 | Smith et al. | |
| 7,347,450 B2 | 3/2008 | Williams et al. | |
| 7,360,789 B2 | 4/2008 | Bito | |
| 7,364,192 B2 | 4/2008 | Braun et al. | |
| 7,556,290 B2 | 7/2009 | Williams et al. | |
| 7,568,729 B2 | 8/2009 | Schnieder et al. | |
| 2003/0020266 A1 | 1/2003 | Vendely et al. | |
| 2003/0020268 A1 | 1/2003 | Reiter et al. | |
| 2003/0057691 A1 | 3/2003 | Tokita et al. | |
| 2003/0127839 A1 | 7/2003 | Jenkins | |
| 2003/0209895 A1 | 11/2003 | Gu | |
| 2003/0214125 A1 | 11/2003 | Schneider et al. | |
| 2004/0012179 A1 | 1/2004 | Pinsenschaum et al. | |
| 2004/0056459 A1 | 3/2004 | Kassman et al. | |
| 2004/0090054 A1 | 5/2004 | Bossecker et al. | |
| 2004/0130135 A1 | 7/2004 | Ekdahl | |
| 2004/0188990 A1 | 9/2004 | Short et al. | |
| 2004/0256842 A1 | 12/2004 | Breed et al. | |
| 2005/0052008 A1 | 3/2005 | Rose et al. | |
| 2005/0098990 A1 | 5/2005 | Pinsenschaum et al. | |
| 2005/0236822 A1 | 10/2005 | Rose et al. | |
| 2005/0248137 A1 | 11/2005 | Delventhal et al. | |
| 2006/0071461 A1 | 4/2006 | Williams et al. | |
| 2006/0071462 A1 | 4/2006 | Smith et al. | |
| 2006/0151979 A1 | 7/2006 | DePottey et al. | |
| 2006/0197327 A1 | 9/2006 | Maripudi et al. | |
| 2006/0202454 A1 | 9/2006 | Parizal et al. | |
| 2007/0052222 A1 | 3/2007 | Higuchi et al. | |
| 2007/0108750 A1 | 5/2007 | Bauer et al. | |
| 2007/0126218 A1 | 6/2007 | Schnieder et al. | |
| 2007/0126219 A1 | 6/2007 | Williams | |
| 2007/0132222 A1 | 6/2007 | Thomas et al. | |
| 2007/0205590 A1 | 9/2007 | Klinkenberger et al. | |
| 2008/0007038 A1 | 1/2008 | Fischer et al. | |
| 2008/0018086 A1 | 1/2008 | Ford et al. | |
| 2008/0023950 A1 | 1/2008 | Kalczynski et al. | |
| 2008/0023959 A1 | 1/2008 | Crawford | |
| 2008/0073890 A1 | 3/2008 | Williams et al. | |
| 2008/0073891 A1 | 3/2008 | Rose et al. | |
| 2008/0073892 A1 | 3/2008 | Rose et al. | |
| 2008/0073893 A1 | 3/2008 | Schneider | |
| 2008/0079250 A1 | 4/2008 | Boyle et al. | |
| 2008/0303256 A1 | 12/2008 | Williams | |
| 2009/0039630 A1 | 2/2009 | Schneider et al. | |

FOREIGN PATENT DOCUMENTS

| | | |
|---|---|---|
| JP | 05085295 | 4/1993 |
| JP | 2001-158315 | 6/2001 |

OTHER PUBLICATIONS

Office Action issued Nov. 18, 2008 in co-pending U.S. Appl. No. 11/528,265.
Preliminary Amendment filed Jun. 8, 2007 in co-pending U.S. Appl. No. 11/589,316.
Office Action issued Nov. 17, 2008 in co-pending U.S. Appl. No. 11/589,316.
Interview Summary issued Dec. 19, 2008 in co-pending U.S. Appl. No. 11/589,316.
Office Action issued Mar. 15, 2006 in co-pending U.S. Appl. No. 10/832,843.
Response to First Office Action filed in co-pending U.S. Appl. No. 10/832,843.
Interview Summary issued Jun. 15, 2006 in co-pending U.S. Appl. No. 10/832,843.
Notice of Allowance issued Jun. 22, 2006 in co-pending U.S. Appl. No. 10/832,843.
Request for Continued Examination filed Sep. 20, 2006 in co-pending U.S. Appl. No. 10/832,843.
Notice of Allowance issued Oct. 3, 2006 in co-pending U.S. Appl. No. 10/832,843.
Office Action issued Sep. 27, 2006 in co-pending U.S. Appl. No. 10/959,387.
Interview Summary issued Jan. 23, 2007 in co-pending U.S. Appl. No. 10/959,387.
Amendment and Response to Office Action filed Feb. 20, 2007 in co-pending U.S. Appl. No. 10/959,387.
Office Action issued May 2, 2007 in co-pending U.S. Appl. No. 10/959,387.
Amendment and Response to Office Action filed Aug. 7, 2007 in co-pending U.S. Appl. No. 10/959,387.
Notice of Allowance issued Oct. 5, 2007 in co-pending U.S. Appl. No. 10/959,387.
Office Action issued Jun. 8, 2007 in co-pending U.S. Appl. No. 11/296,031.
Amendment and Response to Office Action filed Dec. 4, 2007 in co-pending U.S. Appl. No. 11/296,031.
Office Action issued Apr. 21, 2008 in co-pending U.S. Appl. No. 11/296,031.
Amendment and Response to Office Action filed Jul. 21, 2008 in co-pending U.S. Appl. No. 11/296,031.
Office Action issued Oct. 21, 2008 in co-pending U.S. Appl. No. 11/296,031.
Preliminary Amendment filed Mar. 10, 2005 in co-pending U.S. Appl. No. 10/959,256.
Office Action issued Nov. 15, 2006 in co-pending U.S. Appl. No. 10/959,256.
Interview Summary issued Jan. 23, 2007 in co-pending U.S. Appl. No. 10/959,256.
Amendment and Response to Office Action filed Feb. 15, 2007 in co-pending U.S. Appl. No. 10/959,256.
Office Action issued May 21, 2007 in co-pending U.S. Appl. No. 10/959,256.
Amendment and Response to Office Action filed Aug. 16, 2007 in co-pending U.S. Appl. No. 10/959,256.
Notice of Allowance issued Nov. 27, 2007 in co-pending U.S. Appl. No. 10/959,256.
Office Action issued Jul. 11, 2008 in co-pending U.S. Appl. No. 11/528,118.
Amendment and Response to Office Action filed Nov. 24, 2008 in co-pending U.S. Appl. No. 11/528,118.
Interview Summary issued Dec. 15, 2008 in co-pending U.S. Appl. No. 11/528,118.
Notice of Allowance issued Feb. 10, 2009 in co-pending U.S. Appl. No. 11/528,118.
Office Action issued Jun. 30, 2008 in co-pending U.S. Appl. No. 11/528,266.
Amendment and Response to Office Action filed Dec. 1, 2008 in co-pending U.S. Appl. No. 11/528,266.
Interview Summary issued Dec. 16, 2008 in co-pending U.S. Appl. No. 11/528,266.
Notice of Allowance issued Jan. 14, 2009 in co-pending U.S. Appl. No. 11/528,266.
Summary of Interview filed Jan. 16, 2009 in co-pending U.S. Appl. No. 11/528,266.
Office Action issued Dec. 2, 2008 in co-pending U.S. Appl. No. 11/758,419.

Office Action issued Apr. 7, 2008 in co-pending U.S. Appl. No. 11/295,953.
Office Action issued Jul. 1, 2008 in co-pending U.S. Appl. No. 11/295,953.
Amendment and Response to Office Action filed Dec. 1, 2008 in co-pending U.S. Appl. No. 11/295,953.
Office Action issued Sep. 26, 2006 in co-pending U.S. Appl. No. 11/031,394.
Interview Summary issued Jan. 23, 2007 in co-pending U.S. Appl. No. 11/031,394.
Amendment and Response to Office Action filed Mar. 26, 2007 in co-pending U.S. Appl. No. 11/031,394.
Notice of Allowance issued May 7, 2007 in co-pending U.S. Appl. No. 11/031,394.
Office Action issued Jun. 25, 2007 in co-pending U.S. Appl. No. 11/031,394.
Notification of Transmittal of the International Search Report and the Written Opinion of the International Searching Authority issued Oct. 19, 2006 in International Application No. PCT/US2005/025416.
Notification of Transmittal of the International Search Report and the Written Opinion of the International Searching Authority issued Dec. 15, 2006 in International Application No. PCT/US2005/027255.
Notification of Transmittal of the International Search Report and the Written Opinion of the International Searching Authority issued Aug. 20, 2007 in International Application No. PCT/US2006/045367.
Notification of Transmittal of the International Search Report and the Written Opinion of the International Searching Authority issued Sep. 5, 2007 in International Application No. PCT/US2006/045441.
Notification of Transmittal of the International Search Report and the Written Opinion of the International Searching Authority issued Mar. 9, 2007 in International Application No. PCT/US2005/038175.
Notification of Transmittal of the International Search Report and the Written Opinion of the International Searching Authority issued Oct. 22, 2008 in International Application No. PCT/US2008/071337.
Notification of Transmittal of the International Search Report and the Written Opinion of the International Searching Authority issued Aug. 15, 2008 in International Application No. PCT/US2008/060226.
Notice of Allowance issued Apr. 2, 2009 in co-pending U.S. Appl. No. 11/295,953.
Amendment and Response to Office Action filed Apr. 20, 2009 in co-pending U.S. Appl. No. 11/296,031.
Notice of Allowance issued Mar. 23, 2009 in co-pending U.S. Appl. No. 11/528,118.
Office Action issued Mar. 19, 2009 in co-pending U.S. Appl. No. 11/528,266.
Amendment and Response to Office Action filed Apr. 17, 2009 in co-pending U.S. Appl. No. 11/589,316.
Amendment and Response to Office Action filed Apr. 21, 2009 in co-pending U.S. Appl. No. 11/758,419.
Amendment and Response to Office Action filed Mar. 16, 2009 in co-pending U.S. Appl. No. 11/528,265.
Notice of Allowance issued Jul. 29, 2009 in co-pending U.S. Appl. No. 11/296,031.
Notice of Allowance issued Jun. 16, 2009 in co-pending U.S. Appl. No. 11/528,265.
Notice of Allowance issued Jun. 17, 2009 in co-pending U.S. Appl. No. 11/589,316.
Notice of Allowance issued Jun. 19, 2009 in co-pending U.S. Appl. No. 11/758,419.

* cited by examiner

AIRBAG CUSHION WITH ADAPTIVE DIFFUSER FOR OUT-OF-POSITION CONDITIONS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

Index of Elements Identified in the Drawings

| | |
|---|---|
| 30 | occupant |
| 40 | instrument panel |
| 50 | seat |
| 100 | airbag module |
| 101 | airbag cushion |
| 102 | interior of the airbag cushion 101 |
| 102f | front portion of interior 102 |
| 108 | throat |
| 110 | membrane |
| 111 | interior surface of airbag cushion membrane |
| 112 | exterior surface of the airbag cushion membrane |
| 113 | face surface |
| 120 | airbag module housing |
| 122 | inflator |
| 130 | diffuser |
| 131 | material |
| 132 | opening |
| 133 | perimeter of direct opening 134 |
| 134 | additional fixed diffuser vents |
| 135 | diffuser vents |
| 136 | perimeter of diffuser vents 135 |
| 138 | tack stitch |
| 139 | ruptured tack stitch |
| 141 | rim or diameter of diffuser tube |
| 142 | tube of diffuser vent |
| 143 | tether holder of vent such as a sleeve |
| 144 | holes in tether holder of diffuser vent |
| 150 | cushion vent |
| 151 | rim or diameter of cushion vent |
| 170 | control tether |
| 171 | tether attachment |
| 173 | vent portion of vent tether |
| 179 | tether attachment |

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial or suppressed inflation may offer optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment of the airbag cushion has a first cushion vent in the cushion membrane for venting gas. Each embodiment has a diffuser to re-direct the inflation gas from the inflator elsewhere within the airbag cushion. Each diffuser has a first diffuser vent for venting gas out of the diffuser. Each diffuser is connected to the cushion membrane via a component such as a control tether. The tether may be connected at one end to a vent and at an opposing end elsewhere within or on the cushion.

If an occupant is in close proximity to the deploying airbag and restricts normal inflation, the diffuser vent directs gas to the cushion vent to allow gas to rapidly escape. If the occupant is in a normal position and inflation is unrestricted, the tension pulls on the tether to prevent gas from being directed at the cushion vent via the diffuser vent. Thus, the configuration permits the cushion to vary as needed for out-of-position conditions and normal restraint conditions. In this manner, the airbag cushion is sensitive to obstructive expansion of the cushion.

Figure 1A:
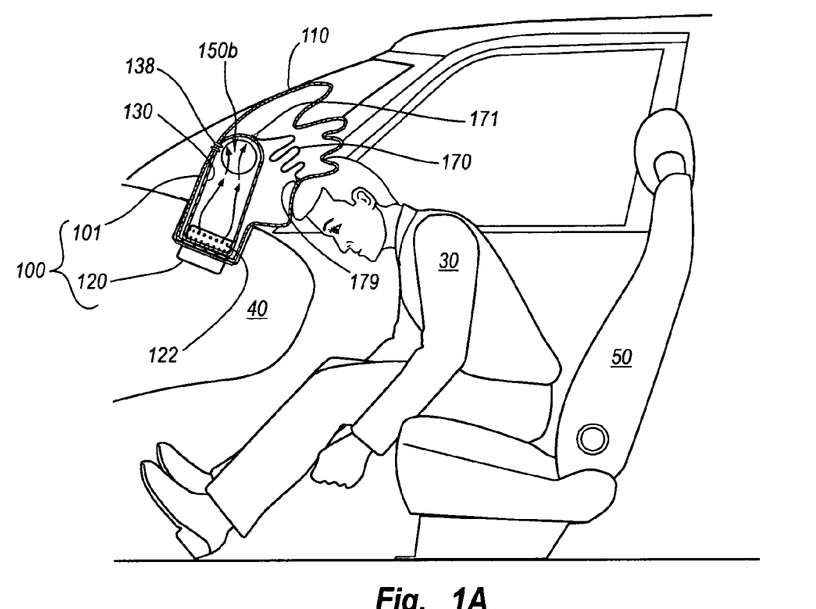
FIG. 1A is a cross-section view of an airbag module encountering an out-of-position vehicle occupant shown in a passenger seat of a vehicle.
Figure 2A:
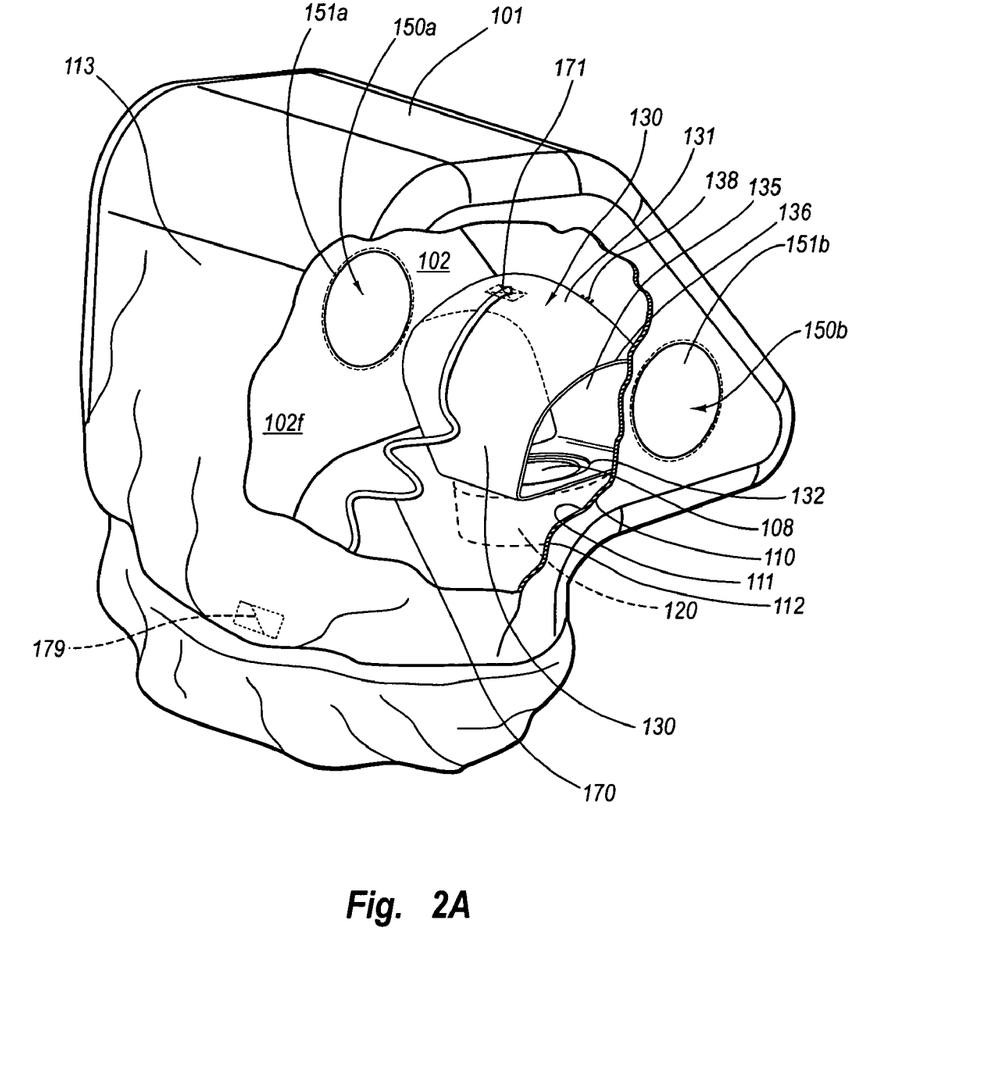
FIG. 2A is a perspective view of the embodiment of the airbag cushion shown in FIGS. 1A-1B. The airbag cushion is shown deploying upon encountering an out-of-position occupant. The airbag cushion is depicted with a partial break-away view to show the control tether in a slack condition and to show the interior of the airbag cushion.
Figure 2B:
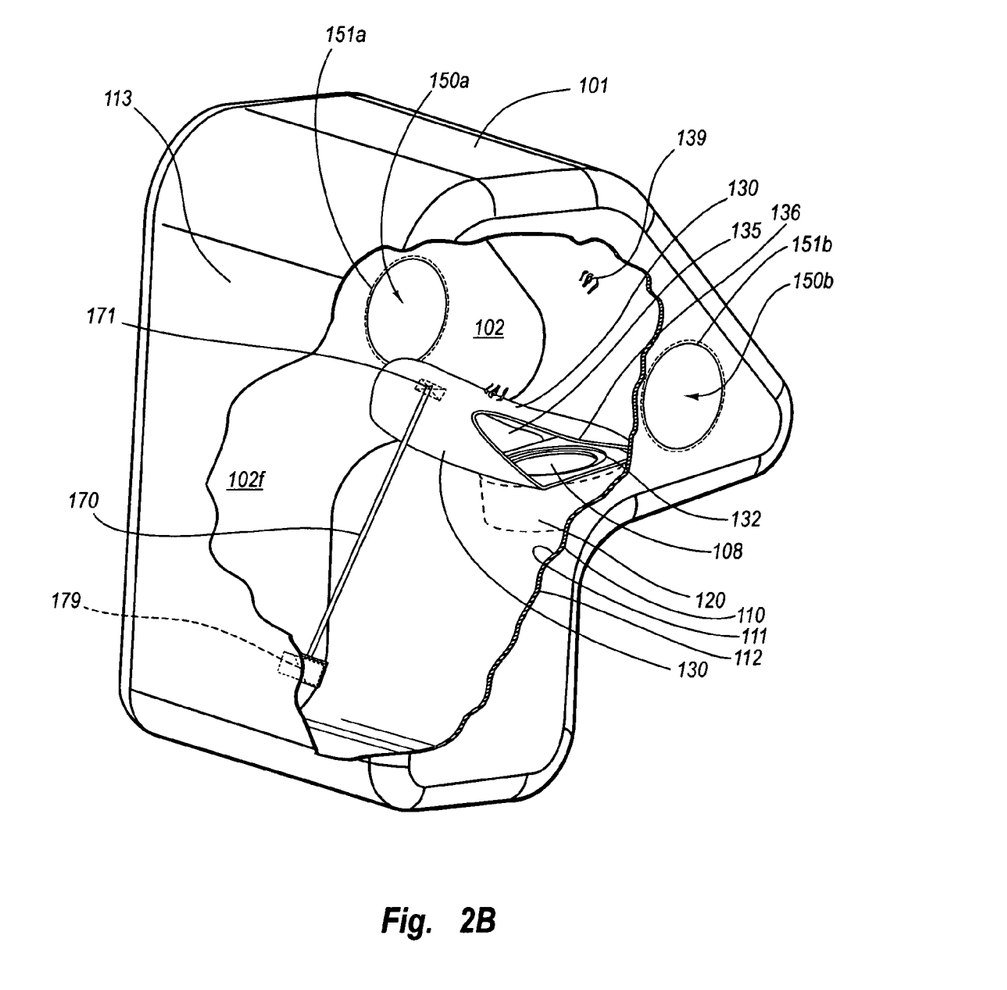
FIG. 2B is a perspective view of the embodiment of the airbag cushion shown in FIGS. 1A-2A after it has fully deployed. The airbag cushion is depicted with a partial break-away view to show the control tether in a taut condition and to show the interior of the airbag cushion.
Figure 3A:
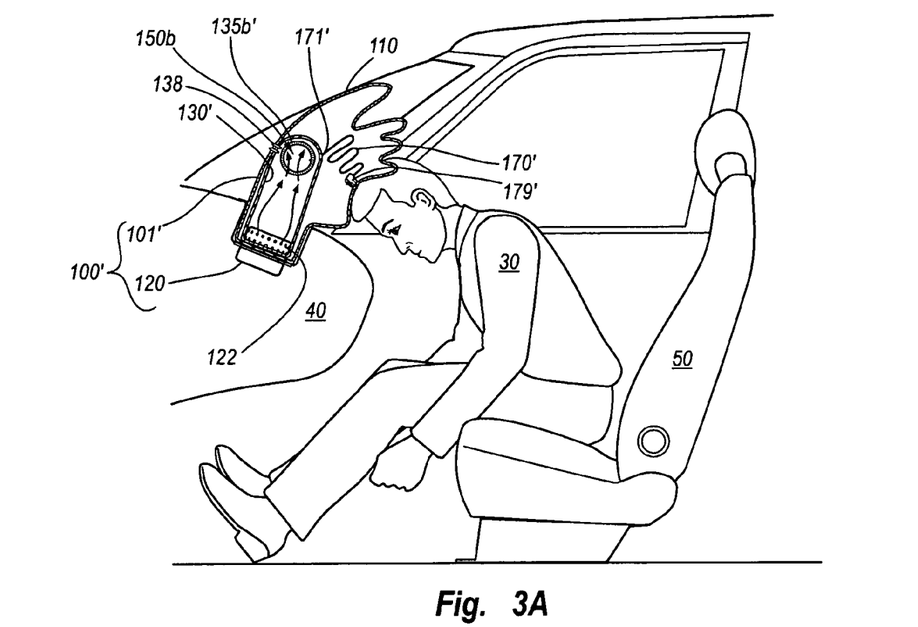
FIG. 3A is a cross-section view of another embodiment of an airbag module encountering an out-of-position vehicle occupant shown in a passenger seat of a vehicle.

With reference now to the accompanying figures, particular embodiments of the invention will now be described in greater detail. One embodiment of airbag module 100 is shown in FIGS. 1A-2B comprising an airbag cushion 101 and a housing 120. Another embodiment of the airbag module is shown in FIGS. 3A-4B at 100'. FIG. 1A and FIG. 2A provide different views of a partially deployed airbag cushion 101 with a diffuser 130 positioned to direct inflation gas out of its diffuser vents 135a-b to the respective cushion vents 150a-b as control tether 170 is slack. The same embodiment is shown fully inflated in FIG. 1B and FIG. 2B with diffuser vents 135 misaligned with the respective cushion vents 150 as control tether 170 is in a taut configuration. Like FIG. 1A and FIG. 2A, FIG. 3A and FIG. 4A provide different views of a partially deployed airbag cushion 101' with a slack control tether 170'. In FIG. 3A and FIG. 4A, diffuser vents 135' of diffuser 130' remain open to direct inflation gas to the respective cushion vents 150 with which they are aligned. The same embodiment is shown fully inflated in FIG. 3B and FIG. 4B with diffuser vents 135' closed and no longer aligned to block the flow of inflation gas out of the diffuser vents 135' to the respective cushion vents 150 as control tether 170' is in a taut configuration.

Figure 1B:
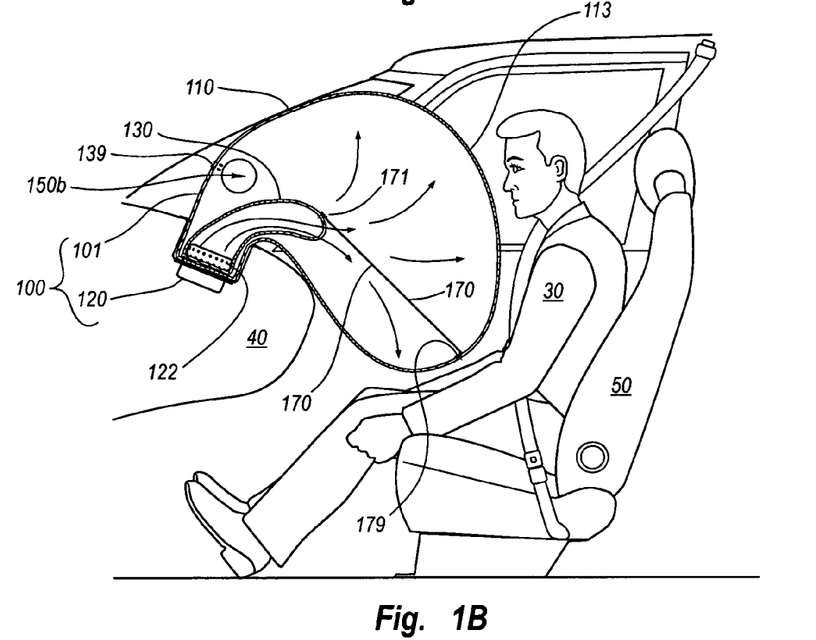
FIG. 1B is a cross-section view of the embodiment of the airbag module shown in FIG. 1A with the airbag cushion fully expanded as the vehicle occupant is in a normal position.

FIGS. 1A-1B respectively show an occupant 30 in an out-of-position (OOP) condition and in a normal condition. FIG. 1A shows occupant 30 leaning toward instrument panel 40 at the time of deployment while FIG. 1B shows occupant 30 seated upright in seat 50. FIG. 2A show airbag cushion 101 as it would appear upon encountering an obstacle such as an out-of-position occupant. FIG. 2B shows airbag cushion 101 as it would appear without encountering an obstacle.

FIGS. 1A-1B show inflator 122 delivering gas into airbag cushion 101 via diffuser 130 within airbag cushion 101. Inflator 122 is within airbag module housing 120 which is positioned under instrument panel 40. Diffuser vent 135b and cushion vent 150b are shown in the view provided by FIGS. 1A-1B while diffuser vent 135a and cushion vent 150a are not shown. Diffuser vents 135a-b are aligned with cushion vents 150a-b in FIG. 1A and are misaligned in FIG. 1B. The alignment is enabled by control tether 170 remaining slack while misalignment is caused by control tether 170 being pulled taut. As indicated above, control tether 170 becomes taut by expansion of the cushion due to the pressure of the gas in airbag cushion 100 when an out-of-position occupant is not encountered.

Some of the structures of the airbag cushion 101 are best seen with reference to FIGS. 2A-2B while FIGS. 1A-1B identify only some components such as diffuser 130, diffuser vent 135b, cushion vent 150b, and control tether 170. Airbag cushion 101 has an interior 102 with front portion 102f. Airbag cushion 101 also has a membrane 110 with an interior surface 111 and exterior surface 112. Gas enters interior 102 via an opening in the membrane 110, throat 108. More specifically, gas enters into the airbag from throat 108 via opening 132 of diffuser 130. Cushion vents 150a-b in membrane 110 enable gas to exit interior 102 of airbag cushion 101. Each cushion vent has a rim or diameter as identified in FIGS. 2A-2B at 151a-b.

Diffuser 130 is configured to create a pressure pocket and re-direct the inflation gas to the cushion vents 150a-b. The embodiment of the diffuser shown in FIG. 2A-2B at 130 is pentagon shaped. In other embodiments, the diffuser may have other shapes. For example, the diffuser may be rectangular, trapezoidal, hexagonal, round, etc. It may also have a portion which is round or elliptical while other portions are angled. Diffuser 130 comprises a material 131 which may be integral with a surface of cushion 101 or attached to cushion 101. For example, diffuser 130 may be sewn together with the cushion.

Figure 4A:
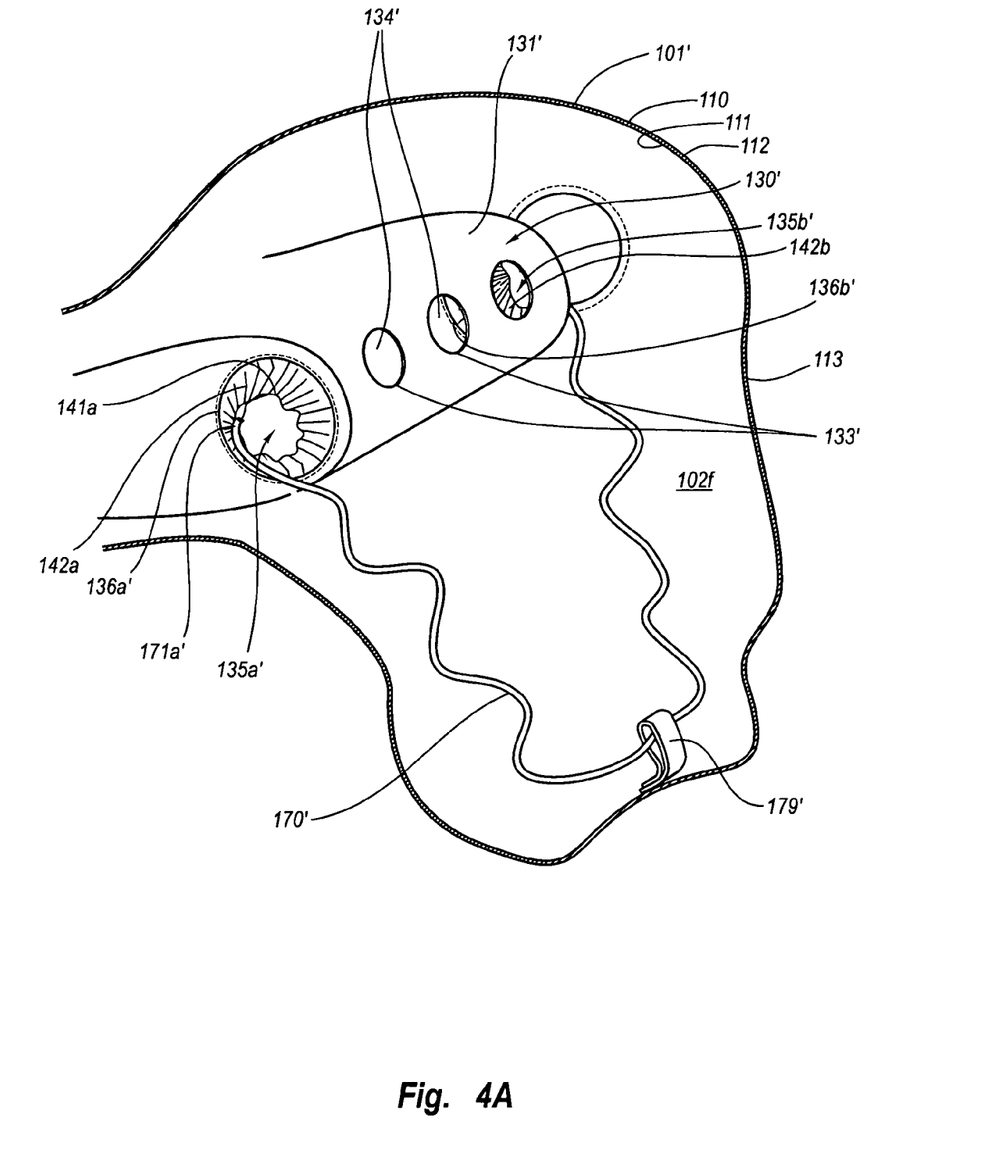
FIG. 4A is a cross-sectional view of the embodiment of the airbag cushion shown in FIGS. 3A-3B with the diffuser and tether shown in a perspective view. The airbag cushion is shown deploying upon encountering an out-of-position occupant. The airbag cushion is depicted with a partial break-away view to show the control tether in a slack condition and to show the interior of the airbag cushion.
Figure 4B:
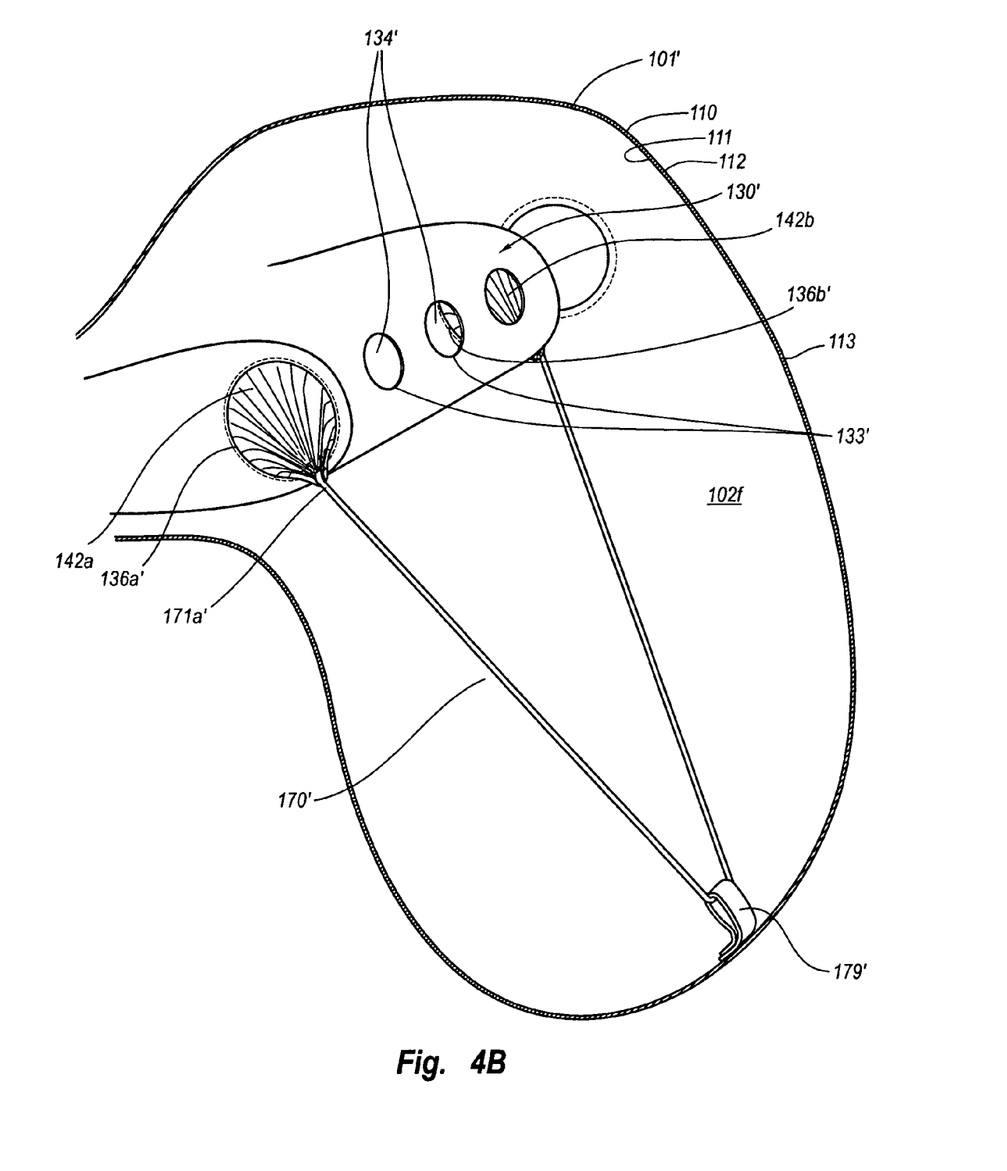
FIG. 4B is a perspective view of the embodiment of the airbag cushion shown in FIGS. 3A-4A after it has fully deployed with the diffuser and tether shown in a perspective view. The airbag cushion is depicted with a partial break-away view to show the control tether in a taut condition and to show the interior of the airbag cushion.

Diffuser vents 135a-b (not shown in FIGS. 1A-1B) are respectively defined by perimeters 136a-b (not shown in FIGS. 1A-1B). Not only are diffuser vents 135a-b strategically located to redirect the gas flow generally toward cushion vents 150a-b and out of interior 102 but diffuser vents 135a-b may also be sized for optimal gas flow. In the depicted embodiment, diffuser vents 135a-b are large enough to allow most of the gas to flow through them. In addition to diffuser vents 135a-135b, one or more additional fixed vents may also be utilized as shown in FIGS. 4A-4B at 134'.

Because diffuser 130 and cushion vents 150a-b are independent of each other, the diffuser openings 135a-b can extend beyond cushion vents 150a-b when no obstruction is encountered, such as an out-of-position occupant. The same is true for the embodiment of the diffuser identified at 130' in FIGS. 3A-4B.

FIG. 2A depicts the configuration of airbag cushion 101 when it is only partially inflated as it has encountered an obstruction. Tether 170 is attached at its diffuser end to diffuser material 131 via a tether attachment 171 and is attached at its opposing cushion end to membrane 110 via a tether attachment 179. As shown in FIGS. 1A and 2A, tether 170 remains slack when encountering an obstruction such as an out-of-position occupant. Because tether 170 is slack, diffuser vents 135a-b remain aligned with cushion vent(s) 150a-b for rapid venting conditions.

Tack stitches 138 can optionally be used to initially secure diffuser 130 to cushion membrane 110. The ruptured tack stitches are identified in FIG. 1B and FIG. 2B at 139. Tack stitches 138 helps ensure that diffuser vents 135a-b remain aligned with cushion vent(s) 150 for rapid venting. Tack stitches 138 are designed to be weak enough to easily rupture as the cushion fully expands to enable the inflation gas to provide for normal occupant restraint. Other examples of releasable temporary holding features, such as tack stitches, which ensure that the diffuser remains in the desired position include fasteners, adhesives, clips, knots, hook and loop fasteners, etc.

FIG. 2B depicts the configuration of airbag cushion 101 when it is fully inflated. Tether 170 has been pulled taut. Due to the length of tether 170 relative to the space within the front portion 102f of interior 102, the expansion of airbag cushion 101 pulls diffuser 130. Pulling diffuser 130 misaligns the large vent(s) 135a-b and vents 150a-b so that the cushion fully expands for normal occupant restraint.

Figure 3B:
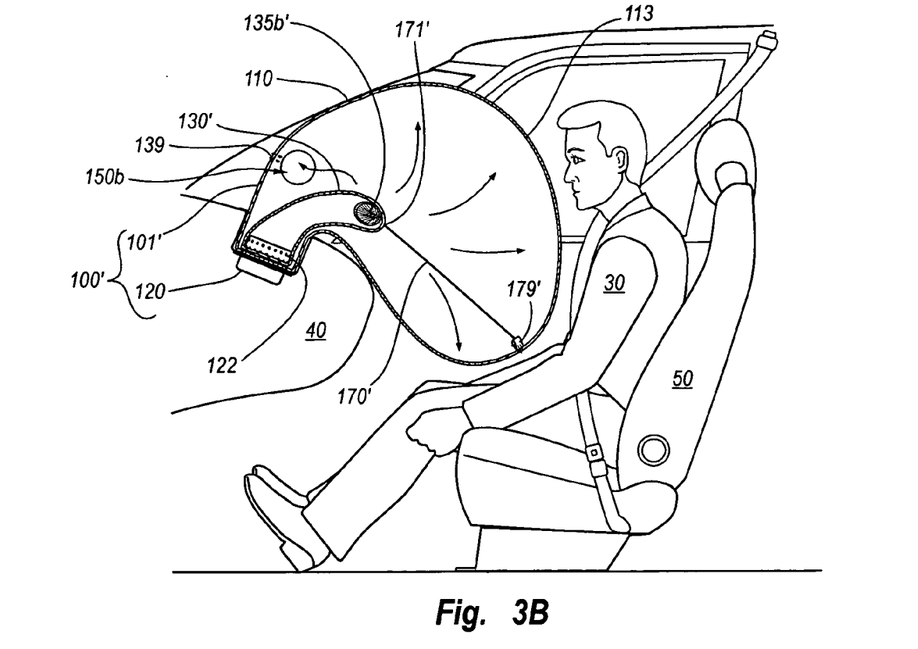
FIG. 3B is a cross-section view of the embodiment of the airbag module shown in FIG. 3A with the airbag cushion fully expanded as the vehicle occupant is in a normal position.

FIGS. 3A-3B depict another embodiment of an airbag module at 100' comprising an airbag cushion 101' and an airbag module housing 120. Diffuser 130' which is shown in more detail in FIGS. 4A-4B has diffuser vents 135a'-b' which are linked to tether 170'. In contrast to diffuser vents 135a-b which are fixed diffuser vents, diffuser vents 135a'-b' are closeable.

As shown in FIG. 3A, when an out-of-position occupant is encountered control tether 170' remains slack so that diffuser vents 135a' (not shown in FIGS. 3A-3B) and 135b' remain respectively aligned with cushion vents 150a (not shown in FIGS. 3A-3B) and 150*b* for rapid venting. Optional tack stitch 138 may be used to ensure initial alignment. When an occupant is in a normal position as shown in FIG. 3B and an obstruction is not encountered, airbag cushion 101' fully expands which pulls tether 170' taut. When tether 170' is pulled taut, diffuser vents 135*a*'-*b*' are closed. Also, diffuser vents 135*a*'-*b*' become misaligned with cushion vents 150*a*-*b*.

FIGS. 4A-4B provide cross-section views of the embodiment of the airbag cushion shown in FIGS. 3A-3B with the diffuser and tether shown in perspective views. Tether 170' is shown in a slack condition in FIG. 4A and in a taut condition in FIG. 4B.

Control tether 170' is configured to move with the expansion of airbag cushion 101'. One end of tether 170' is connected to tube 142*a* of diffuser vent 135*a*' by tether attachment 171*a*' and the other end is attached to tube 142*b* of diffuser vent 135*b*' by tether attachment 171*b*' (not shown). Tether 170' is coupled to cushion membrane 110 via a tether attachment 179' which is part of or extends from membrane 110 of airbag cushion 101. Tether attachment 179' serves as an anchor for tether 170'. Tether attachment 179' as shown in FIGS. 4A-4B is essentially a loop that permits movement of tether 170'.

In the other depicted embodiment, tether attachment 179 is anchored by stitching between cushion membrane 110 and tether 170. Two tethers like tether 170 could also be used instead of tether 170' so that each tether has one end attached to a feature which closes a diffuser vent and another end which is fixedly attached to the cushion membrane like tether 170 via tether attachment 179. Of course, diffuser 130 could also be moved by a tether such as tether 170' which is attached to diffuser 130 at two points and is anchored to cushion membrane via a feature such as tether attachment 179'.

In the depicted embodiment, tether attachment 179' is located at the front portion 102*f* of the interior 102 of the cushion membrane just below face surface 113, which is the surface of the airbag cushion directed to the occupant. The tether attachment may be disposed elsewhere such as proximate to a different portion of interior surface 111. For example, the tether attachment may be opposite face surface 113. Alternatively, the tether attachment may be a portion of exterior surface 112. Thus, tether 170 may extend through the interior 102 of the airbag cushion 101 or may be positioned exterior to the airbag cushion 101. The location of the tether attachment depends on module deployment angle, vehicle interior geometry, and cushion type. In another embodiment, the control tether is an integral extension of either cushion membrane 110 or tube 142. The tether may comprise a nylon material or other suitable material known in the art.

Figure 5A:
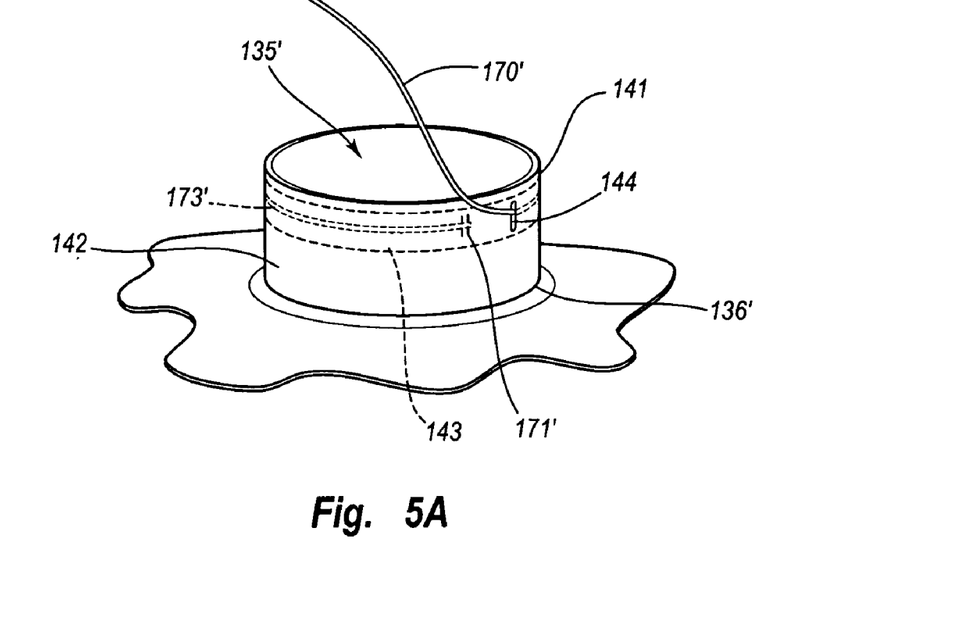
FIG. 5A is a perspective view of a closeable diffuser vent which is open.
Figure 5B:
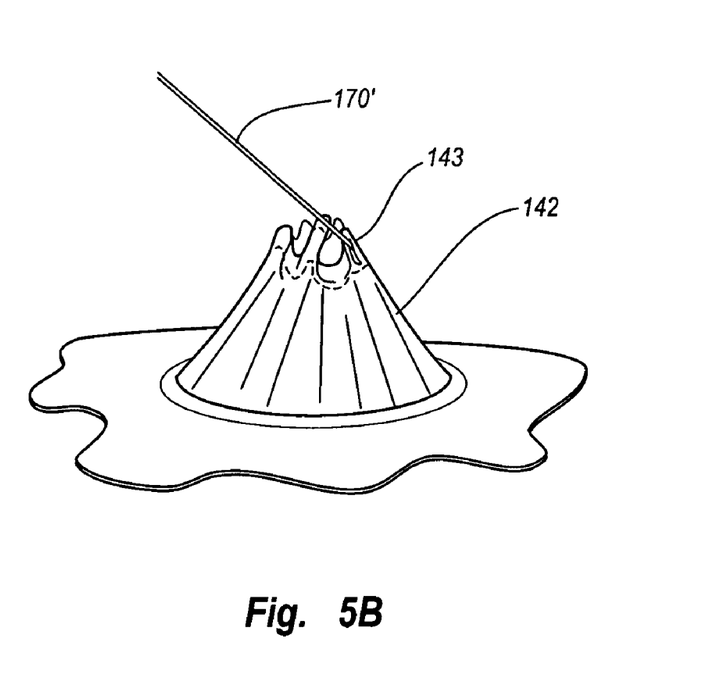
FIG. 5B is a perspective view of the diffuser vent in FIG. 5A after cinching.

FIGS. 5A-5B depict control tether 170' and the components of diffuser vent 135' in more detail. Note that since the features shown may be on either side of the airbag cushion no designations such as "a" and "b" are used in FIGS. 5A-5B. Note also, that while the depicted embodiments show two cushion vents and two corresponding diffuser vents, another embodiment may only have a single cushion vent and a single corresponding diffuser vent while other embodiments may include multiple vents to provide the desired venting capability.

Tether 170' has an end with a tether attachment 171' which is stitching, however, attachment may also be achieved by bonds, adhesives, etc. Tether 170' has a vent portion 173' around the majority of the perimeter of cinch tube 142. Vent portion 173' is the portion of tether 170 which actuates closeable diffuser vent 135'. Vent portion 173' circumvents a majority of the perimeter of cinch tube 142 within sleeve 143 in order to properly tighten and restrict the cinch vent 135'. Vent portion 173' enters sleeve 143 via sleeve aperture 144. As shown in FIG. 5B, sleeve 143 is gathered together when cord 170' has been pulled taut. By causing cinch tube 142, particularly rim 141, to collapse on itself, diffuser vent 135 is closed. In other embodiments, sleeve 143 features numerous apertures to facilitate cinching or a plurality loops or tabs may collectively act as a cord holder. Optional tack stitching may be used to retain cord 170' in an initially fixed position within sleeve 143 and prevent inadvertent closing of the diffuser vent 135 during shipping and handling. Such tack stitching is designed to be easily broken and provides no interference to airbag cushion deployment.

Tether attachment 179 or 179' may also be located at the base of a fold and the fold may be stitched together with an optional tack stitch as disclosed in U.S. patent application Ser. No. 11/528,265, now U.S. Pat. No. 7,614,653 titled PRE-FOLDED AIRBAG CUSHION WITH OPTIONAL VENTING FOR OUT-OF-POSITION CONDITIONS which was filed on Sep. 27, 2006. An optional tack stitch is advantageous to prevent undesired closure of diffuser vents during shipping or handling and to ensure that the tether remains slack during initial deployment of the airbag. The releasable temporary holding features discussed above as alternatives to tack stitches 138 may also be used to hold a fold so that the tether does not prematurely actuate the gas venting features.

Cinch tube 142 may have any suitable shape such as rectangular, triangular, or polygon shapes. The cinch tube may be embodied with a height that is sufficient to achieve desired closure. In one embodiment, the cinch tube has height which is about half of its diameter. Selecting an appropriate height to diameter ratio permits the cinch tube to close during cinching without resistance from membrane tension. The design permits the cinch tube to be a low-stress element in the cushion assembly which is helpful during unfolding of the cushion and pressurization. The cinch tube may comprise the same material used for membrane 110 such as a nylon woven fabric-type or other suitable material known in the art. Designs for incrementally closing a cinch tube are disclosed in U.S. patent application Ser. No. 11/295,953 titled LOCKING MECHANISM FOR A CINCH TUBE OF AN AIRBAG CUSHION which was filed on Dec. 7, 2005.

In addition to the closeable diffuser vents in the depicted embodiments, other configurations for closeable vents may also be used. Examples of suitable configurations for a closeable vent are also disclosed in U.S. patent application Ser. No. 11/528,266, now U.S. Pat. No. 7,722,080 titled AIRBAG CUSHION WITH A FLAP VENT TO OPTIONALLY VENT GAS FOR OUT-OF-POSITION CONDITIONS which was filed on Sep. 27, 2006 and U.S. patent application Ser. No. 11/528,118, now U.S. Pat. No. 7,556,290 titled AIRBAG CUSHION WITH A LACED VENT TO OPTIONALLY VENT GAS FOR OUT-OF-POSITION CONDITIONS which was filed on Sep. 27, 2006; U.S. patent application Ser. No. 11/296,031 titled AIRBAG CUSHION WITH DIFFUSER AND CINCH TUBE TO VENT GAS FOR OUT-OF-POSITION CONDITIONS which was filed on Dec. 7, 2005; U.S. patent application Ser. No. 10/959,256 titled AIRBAG CUSHION WITH VENT FOR REDUCED OUT-OF-POSITION EFFECTS which was filed on Oct. 6, 2004; U.S. patent application Ser. No. 10/959,387 titled AIRBAG CUSHION WITH TETHER DEACTIVATED VENTING FOR REDUCED OUT-OF-POSITION EFFECTS which was filed on Oct. 6, 2004; and U.S. patent application Ser. No. 10/832,843 titled CUSHION VENTING DESIGN FOR OUT OF POSITION OCCUPANT PROTECTION which was filed on Apr. 27, 2004.

Additional fixed diffuser vents 134' allow alternative gas flow paths into interior 102 and do not vary in flow based on encountering an obstruction. Additional fixed diffuser vents 134' may be used to provide consistent venting of the airbag cushion which are not restricted by an occupant's position. Such additional fixed diffuser vents may be smaller or larger than cushion vents 150a-b.

Embodiments disclosed herein illustrate novel techniques for venting gas when an occupant obstructs the path of a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

The embodiments of a cushion vent disclosed herein are examples of means for venting gas out of the cushion membrane. The embodiments of diffusers disclosed herein are examples of means for diffusing gas by re-directing inflation gas from an inflator to a diffuser vent. The embodiments of diffuser vents disclosed herein are examples of means for venting gas out of the diffusing means. The tether disclosed herein are examples of means for tethering the diffusing means to the cushion membrane. The temporary holding features, such as tack stitches, configured to initially secure the diffusing means to cushion membrane are examples of means for temporarily securing the diffusing means to the cushion membrane.

The patent applications and the patents which issue from the above referenced applications are hereby incorporated by reference. The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be apparent to those having skill in the art that changes may be made to the details of the above-described embodiments without departing from the essential characteristics and underlying principles of the invention. Embodiments of the invention in which an exclusive property or privilege is claimed are defined as follows. Note that elements recited in means-plus-function format are intended to be construed in accordance with 35 U.S.C. §112 ¶6.

The invention claimed is:

1. An airbag module, comprising:
   an inflatable airbag cushion having a cushion membrane with a first cushion vent,
   a diffuser having a first diffuser vent, wherein the diffuser is positioned and configured to re-direct inflation gas from an inflator to the first diffuser vent, and wherein the diffuser is positioned and configured to provide an aligned configuration between the first diffuser vent and the first cushion vent when deployment of the airbag is obstructed such that the gas rapidly exits the inflatable airbag cushion via the first cushion vent, and
   a tether extending between the cushion membrane and the diffuser such that upon deployment of the inflatable airbag cushion with obstruction, the tether does not fully extend and gas continues to be directed via the first diffuser vent toward the first cushion vent to prevent the airbag cushion from fully expanding, and upon deployment of the inflatable airbag cushion without obstruction, the tether extends sufficiently to pull the diffuser such that the first diffuser vent moves from the aligned configuration with respect to the first cushion vent to a misaligned configuration, which reduces the flow of gas directed toward the first cushion vent via the first diffuser vent and increases the flow of gas into the inflatable airbag cushion to enable the inflatable airbag cushion to fully expand.

2. The airbag module of claim 1, wherein the tether is anchored to the cushion membrane via a tether attachment.

3. The airbag module of claim 1, wherein the tether is fixedly anchored to the cushion membrane.

4. The airbag module of claim 1, wherein the tether is moveably anchored to the cushion membrane.

5. The airbag module of claim 1, wherein the tether is anchored to the cushion membrane at the front portion of the interior of the cushion membrane.

6. The airbag module of claim 1, wherein a releasable temporary holding feature temporarily attaches the diffuser to the cushion membrane.

7. The airbag module of claim 1, wherein the releasable temporary holding feature ensures alignment of the first cushion vent and the first diffuser vent during initial deployment of the airbag module.

8. The airbag module of claim 1, wherein the first cushion vent and the first diffuser vent are sufficiently spaced apart from each other such that the first cushion vent and the first diffuser vent are not in physical contact once the airbag has expanded with or without obstruction.

9. The airbag module of claim 1, wherein the diffuser is positioned around the inflator.

10. The airbag module of claim 1, wherein the first cushion vent remains open when the airbag cushion expands.

11. The airbag module of claim 10, further comprising a second diffuser vent in the diffuser and a second cushion vent in the cushion membrane which are initially aligned.

12. An airbag module, comprising:
    an inflatable airbag cushion having a cushion membrane with a first cushion vent,
    a diffuser having a first fixed diffuser vent, wherein the diffuser is positioned over an inflator and is configured to re-direct inflation gas from the inflator and out of the first fixed diffuser vent, and
    a tether extending between the cushion membrane and the diffuser,
        wherein the first fixed diffuser vent is initially aligned with the first cushion vent such that upon deployment of the inflatable airbag cushion with obstruction gas is vented out of the first cushion vent which is directly received from the first fixed diffuser vent, and
        wherein the tether pulls the diffuser upon deployment of the inflatable airbag cushion without obstruction to misalign the first fixed diffuser vent and the first cushion vent so that gas from the first fixed diffuser vent is not directed at the at least one cushion vent and the airbag cushion fully deploys.

13. The airbag module of claim 12, wherein the tether is anchored to the cushion membrane via a tether attachment.

14. The airbag module of claim 12, wherein the tether is fixedly anchored to the cushion membrane.

15. The airbag module of claim 12, wherein the tether is moveably anchored to the cushion membrane.

16. The airbag module of claim 12, wherein the tether is anchored to the cushion membrane at the front portion of the interior of the cushion membrane.

17. The airbag module of claim 12, wherein a releasable temporary holding feature temporarily attaches the diffuser to the cushion membrane.

18. The airbag module of claim 12, wherein the releasable temporary holding feature ensures alignment of the first cushion vent and the first fixed diffuser vent during initial deployment of the airbag module.

19. An airbag module, comprising:
an inflatable airbag cushion having a cushion membrane with a first cushion vent,
a diffuser having first closeable diffuser vent, wherein the diffuser is positioned over an inflator and is configured to re-direct inflation gas from the inflator and out of the diffuser, and
a tether extending between the cushion membrane and the first closeable diffuser vent,
wherein gas is vented out of the first cushion vent which is directly received from the first closeable diffuser vent upon deployment of the inflatable airbag cushion with obstruction, and
wherein deployment without obstruction enables the tether to become sufficiently taut to cause the reduction of the flow of gas directed toward the first cushion vent via the first closeable diffuser vent to enable the inflatable airbag cushion to fully expand.

20. The airbag module of claim 19, wherein the tether is anchored to the cushion membrane via a tether attachment.

21. The airbag module of claim 19, wherein the tether is fixedly anchored to the cushion membrane.

22. The airbag module of claim 19, wherein the tether is moveably anchored to the cushion membrane.

23. The airbag module of claim 19, wherein the tether is anchored to the cushion membrane at the front portion of the interior of the cushion membrane.

24. The airbag module of claim 19, wherein a releasable temporary holding feature temporarily attaches the diffuser to the cushion membrane.

25. The airbag module of claim 19, wherein the releasable temporary holding feature ensures alignment of the first cushion vent and the first closeable diffuser vent during initial deployment of the airbag module.

26. The airbag module of claim 19, wherein the flow of gas directed toward the first cushion vent via the first closeable diffuser vent is reduced upon deployment without obstruction because the tether has become sufficiently taut to at least partially close the first closeable diffuser vent.

27. The airbag module of claim 19, wherein the flow of gas directed toward the first cushion vent via the first closeable diffuser vent is reduced upon deployment without obstruction because the tether has become sufficiently taut to cause misalignment of the first closeable diffuser vent and the first cushion vent.

28. An airbag module, comprising:
an inflatable airbag cushion having a cushion membrane with means for venting gas out of the cushion membrane, wherein the means for venting gas out of the cushion membrane remain open when the airbag cushion expands,
means for diffusing gas by re-directing inflation gas received directly from an inflator to means for venting gas out of the diffusing means,
means for tethering the diffusing means to the cushion membrane such that upon deployment of the inflatable airbag cushion with obstruction, the tethering means does not fully extend and gas continues to be directed via means for venting gas out of the diffusing means toward the means for venting gas out of the cushion membrane to prevent the airbag cushion from fully expanding, and upon deployment of the inflatable airbag cushion without obstruction, the tethering means extends sufficiently to cause the reduction of the flow of gas directed toward the means for venting gas out of the cushion membrane via the means for venting gas out of the diffusing means to enable the inflatable airbag cushion to fully expand.

29. The airbag module of claim 28, further comprising means for temporarily securing the diffusing means to the cushion membrane.

* * * * *